US005578257A

United States Patent [19]
Van den Sype

[11] Patent Number: 5,578,257
[45] Date of Patent: Nov. 26, 1996

[54] BINDER REMOVAL FROM MULTILAYER CERAMIC STRUCTURES

[75] Inventor: Jaak S. Van den Sype, Scarsdale, N.Y.

[73] Assignee: Praxair Technology, Inc., Danbury, Conn.

[21] Appl. No.: 376,790

[22] Filed: Jan. 23, 1995

Related U.S. Application Data

[63] Continuation of Ser. No. 169,533, Dec. 20, 1993, abandoned, which is a continuation of Ser. No. 930,937, Aug. 17, 1992, abandoned.

[51] Int. Cl.$^6$ ................................................. C04B 35/10
[52] U.S. Cl. .......................... 264/40.1; 264/61; 264/63; 264/344
[58] Field of Search ................................ 264/40.1, 61, 63, 264/344

[56] References Cited

U.S. PATENT DOCUMENTS

| | | | |
|---|---|---|---|
| 4,234,367 | 11/1980 | Herron et al. | 156/89 |
| 4,736,276 | 4/1988 | Ushifusa | 264/61 |
| 4,971,738 | 11/1990 | Herron | 264/61 |
| 4,994,436 | 2/1991 | Giacobbe | 505/1 |
| 5,082,606 | 1/1992 | Rotman et al. | 264/40.6 |

OTHER PUBLICATIONS

"Removal of Carbonaceous Residue With Wet Hydrogen In Greensheet Processing for Multilayer Ceramic Module: 1, Residue Formation and Intrinsic Chemical Kinetics" by Wall et al., J. Am. Ceram. Soc., 73(10) 2944–52 (1990).

"Removal of Carbonaceous Residue With Wet Hydrogen in Greensheet Processing For Multilayer Ceramic Module: II, Reaction in Layer Modules Influenced by Pore Diffusion and Mass Transfer" by Sohn et al. J. Am. Ceram. Soc., 73(10) 2953–61 (1990).

"Furnace Atmosphere's Effect On Cofiring Tungsten–Alumina Multilayer Substrates" by Hayduk et al., Solid State Technology/Sep. 1986 pp. 135–138.

Cima et al., "Firing–Atmosphere Effects On Char Content from Alumina–Polyvinyl Butyral Films", *Ceramic Transactions* (Ceramic Powder Science II,A), vol. 1, pp. 567–574 (1988).

*Primary Examiner*—James Derrington
*Attorney, Agent, or Firm*—Douglas E. Denninger

[57] ABSTRACT

A process for removing poly(vinylbutyral) binder from multilayer alumina structures containing metal circuitry. The green structure is heated in a defined atmosphere which is reducing or neutral with respect to the metal circuitry, and at higher temperatures, oxidizing with respect to carbon. The atmosphere comprises inert gas, water vapor and up to about 20% hydrogen.

18 Claims, 2 Drawing Sheets

BINDER REMOVAL FROM MULTILAYER CERAMIC STRUCTURES

This application is a continuation of prior U.S. application Ser. No. 08/169,553 filed Dec. 20, 1993, now abandoned which is a continuation of application Ser. No. 07/930,937 filed Aug. 17, 1992, now abandoned.

TECHNICAL FIELD

This invention relates to the formation of an object from sinterable particles of alumina material initially held together by poly(vinylbutyral) binder, and, more specifically, to a method of rapidly removing binder and carbonaceous material produced by binder decomposition from the green object.

BACKGROUND

DETAILED DESCRIPTION OF THE INVENTION

Multilayer ceramic modules are in widespread use in microelectronic technologies. In their fabrication, an organic binder, solvents and ceramic particles are cast into thin sheets. The sheets are dried, punched with holes to provide access for conduction paths and screened with a metal paste to form the conduction paths for electrical circuits. Most commonly, the materials used are alumina powder, poly(vinylbutyral) binder and tungsten or molybdenum metal lines for circuitry.

The green sheets are stacked and laminated under pressure to form a green module. The green module is then fired to remove the binder and to sinter the particles into a miniature brick. During the initial stages of firing, that is, at temperatures below 600° C. (873K), the binder volatilizes and decomposes producing a carbonaceous residue at the surface of the ceramic particles and metal particles. This debinding stage is critical in the formation of sound ceramic parts. Often internal pores and crack are formed during the debinding due to the internal pressures generated by the evolving gases. Heating rates during the debinding stage must be low enough to avoid bloating and cracking. The required debinding times are often several hours for thicker parts.

Most of the carbonaceous residue must be removed to achieve desirable electrical and mechanical properties in the module. As the carbonaceous residue level increases, the dielectric constant of the substrate increases resulting in increased signal delay times. At high carbonaceous residue levels, occasional shorts occur between the intended conduction paths.

The carbonaceous residue level is affected by processing variables-significantly, by the composition of the atmosphere in the firing process during which debinding occurs. Oxidizing atmospheres at the higher firing temperatures proximately below the temperature at which the pores in the ceramic structure begin to close, about 1270K, produce lowest levels of carbonaceous residue. However at these temperatures, the metal circuitry is also subject to oxidation. Thus at these higher temperatures in the firing, the atmosphere is desirably reducing or neutral with respect to the metal and oxidizing with respect to the carbonaceous residue.

Such a mild oxidizing atmosphere has been provided by water vapor in hydrogen, often diluted by an inert gas, usually nitrogen. FIG. 1 depicts as a function of temperature the hydrogen-to-water ratio for equilibrium between carbon and carbon dioxide; between tungsten and tungsten trioxide; and between molybdenum and molybdenum dioxide. As can be seen, above approximately 973K for tungsten, and above approximately 1073K for molybdenum, it is possible to provide an atmosphere of hydrogen and water which will be reducing or neutral to the metal and also oxidizing with respect to carbon.

Sohn and Wall in their publication entitled "Removal of Carbonaceous Residue with Wet Hydrogen in Green Sheet Processing of Multilayer Ceramic Module: II, Reaction in Large Modules Influenced by Pore Diffusion and Mass Transfer" published in *J. Am. Ceram. Soc.*, 73 (10) 2953-61 (1990) suggest continuously adjusting the water and hydrogen concentration as a function of firing temperature of the module to maintain the equilibrium value for molybdenum oxidation. While this criterion is useful to establish the hydrogen-to-water ratio in a mixture of hydrogen and water alone, it does not provide guidance as to appropriate levels of hydrogen and water in admixture with an inert gas.

Typically water is introduced into the gaseous atmosphere by bubbling a hydrogen and nitrogen gas mixture through liquid water at a given temperature. Such coarse control of the water oxidant is difficult and imprecise, however, resulting in variable levels of carbonaceous residue and at times oxidization of the metal circuitry. Furthermore, the composition achieved at the entry of the gas into the debinding furnace may not be that desired at the reactive site itself. In addition, altering the composition of an atmosphere at one or more points in a furnace is operationally difficult where the atmosphere is created by bubbling gas through liquid water.

The debinding process, to avoid deleterious results such as bloating, cracking, low densification, warping, and delamination, is usually conducted at a low rate of heating. Typically the rate of heating does not exceed 5 K/min, which causes undesirably long processing times.

An advantage of this invention is that low carbonaceous residue levels are achieved in the firing process.

Another advantage of this invention is that higher rates of heating without damage to the product are achieved in the debinding process resulting in shorter processing times.

Still another advantage of this invention, is that closer control of the firing atmosphere is achieved resulting in a product of less variability in properties.

SUMMARY OF THE INVENTION

The invention provides a process capable of debinding to a low carbonaceous residue content of less than 500 ppm a green structure comprising metal circuitry deposited on ceramic powder containing alumina and binder, wherein the binder contains poly(vinylbutyral). The process comprises:

(a) providing an initial atmosphere comprising inert gas and up to 20% hydrogen by volume which is reducing or neutral with respect to the metal circuitry;

(b) initially heating the green structure in the initial atmosphere to a temperature at which the atmosphere can be both oxidizing with respect to carbon and neutral or reducing with respect to the metal circuitry;

(c) providing a subsequent atmosphere comprising inert gas, water vapor, and up to 20% hydrogen, said subsequent atmosphere being oxidizing with respect to carbon and neutral or reducing with respect to the metal circuitry; and (d) subsequently heating the structure in the subsequent atmosphere to a temperature at which the evolution of binder and carbonaceous matter from the structure substantially ceases.

In another embodiment, the process further comprises the prior steps of:

(e) providing a preheating dry atmosphere comprising inert gas with up to 20% hydrogen by volume; and (f) preheating the green structure in the preheating atmosphere to a temperature from about 670K to about 970K.

DESCRIPTION OF THE INVENTION

A green module comprised of alumina particles agglomerated by poly(vinylbutyral) binder and containing metal circuitry is placed in a furnace. The furnace may be a conventional batch furnace or a continuous furnace. A continuous furnace should be capable of heating the module and then progressively cooling the module as it travels through the furnace. The continuous furnace should be capable of containing at least two zones of differing atmosphere. A preferred method and apparatus for providing such zones is disclosed in U.S. Pat. No. 4,910,998 entitled "Method And Apparatus For Controlling Flow Bias In A Multiple Zone Process".

An atmosphere of nitrogen containing up to 20% hydrogen is passed over the module. Optionally, the gaseous atmosphere may contain some oxidant such as water or oxygen. In initial heating in such an atmosphere, oxidation of the metal circuitry is avoided because temperatures are too low for oxidation to occur at an appreciable rate.

Figure 1:
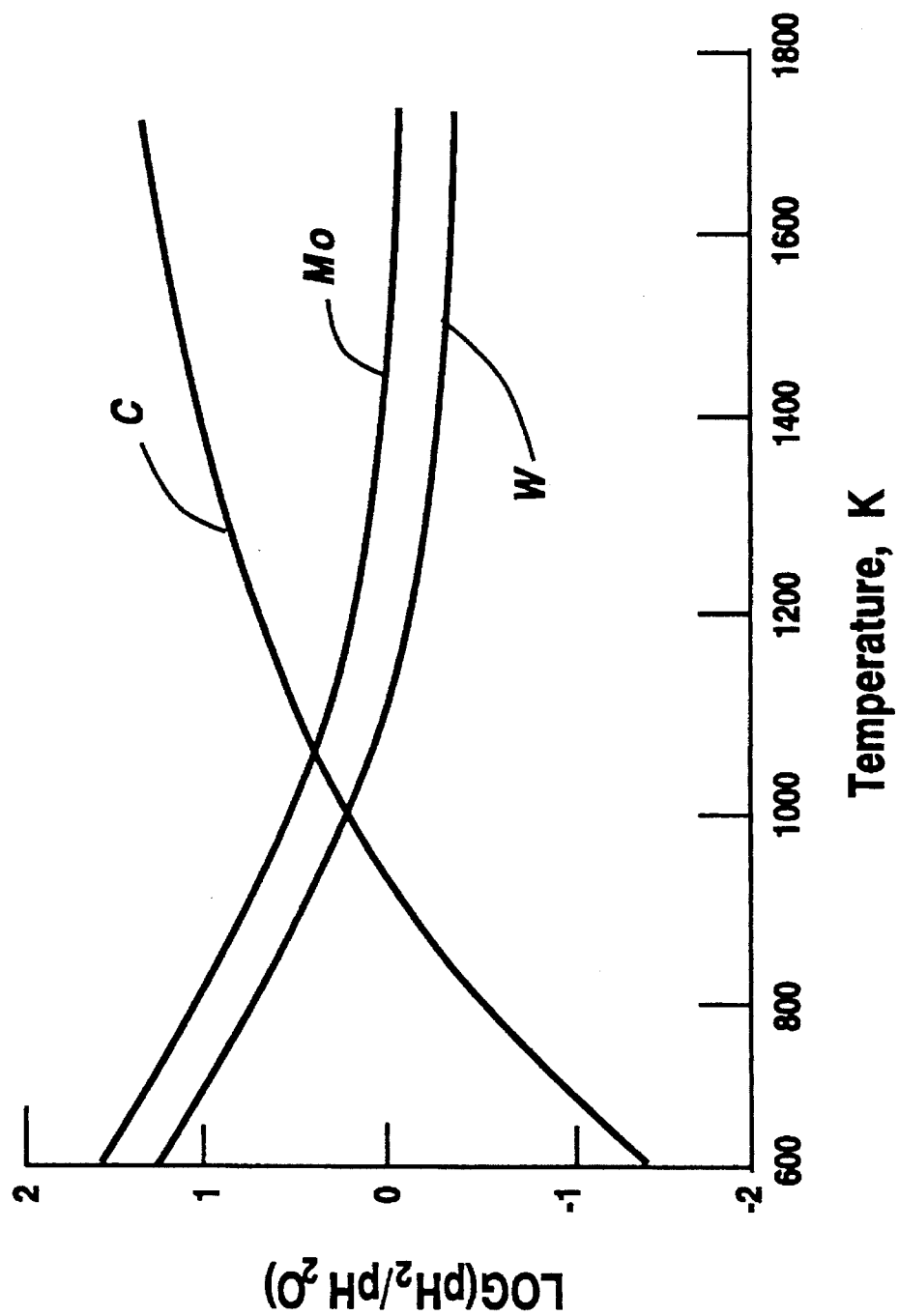
FIG. 1 is a graph of the log of the ratio of partial pressure of hydrogen to the partial pressure of water for the equilibrium between carbon, tungsten and molybdenum individually, each to their respective oxides as a function of temperature in an atmosphere of hydrogen and water.

The module is heated at a rate of from about 2 to about 10 K/min (preferably from about 4 to about 10 K/min) to a temperature where the chemical equilibrium relations are such that the atmosphere can be neutral or reducing with respect to the metal employed and oxidizing with respect to carbon. Water is then introduced into the atmosphere to maintain this condition at and above this temperature. As shown on FIG. 1, for tungsten circuitry, this temperature is about 970K, and the required hydrogen-to-water ratio at this temperature is about 2. For molybdenum circuitry, this temperature is about 1070K, and the required hydrogen-to-water ratio at this temperature is about 2.5.

Heating is continued to a temperature in the range of about 1270K at which temperature the alumina particles begin to sinter. The open pores in the alumina through which carbonaceous matter could have been removed by reaction with an oxidizing atmosphere then begin to close. Any ungasified carbonaceous matter in the structure is trapped and cannot subsequently be removed from the structure. At this temperature, the evolution of binder and carbonaceous matter substantially ceases.

Heating is further continued typically to about 1825K which is held for 30 to 60 minutes to sinter the module to its final density. During this stage of the heating, the sintering, the atmosphere is less critical and can be any atmosphere which is not oxidizing with respect to the metal circuitry, such as nitrogen. The module is then cooled in the sintering atmosphere.

In another embodiment which has the capability of yielding product with still lower levels of carbonaceous residue, the invention additionally comprises the prior step of preheating the green structure in a dry atmosphere comprised of inert gas and up to 15% hydrogen by volume to a temperature of from about 670K to about 970K. At this temperature, water is introduced to a level so that the atmosphere remains reducing or neutral with respect to the metal circuitry. Heating is continued. At a temperature where the chemical equilibrium relations are such that the atmosphere can be neutral or reducing with respect to the metal employed and oxidizing with respect to carbon, additional water is introduced into the atmosphere to achieve this condition. The process is then continued as described in the previous embodiment.

To create the oxidizing atmospheres specified, an oxygen-containing gas, such as, but not limited to, oxygen itself, or water, which dissociates to form oxygen, may be added to a gas stream of otherwise appropriate stoichiometric composition. For instance, a gas stream of appropriate composition on a water-free basis may be bubbled through a water bath at an appropriate temperature to introduce water. Alternatively the water could be metered as a separate stream of liquid water or water vapor and injected into the gas stream of otherwise appropriate composition. The atmosphere may also be created from an inert gas stream, a hydrogen bearing gas stream and an oxygen-containing gas stream which are combined upstream of the furnace or in the furnace. The combined streams may be passed over a catalyst to accelerate their attaining their equilibrium composition, prior to injection into the furnace. In a continuous furnace, a stream or streams of appropriate gas may be injected at points of appropriate temperature along the length of the furnace to adjust the composition of the atmosphere locally.

Preferably, the oxygen concentration is measured by an in-situ oxygen probe proximate to the module, and the oxidant supply is adjusted in accord with the reading of the probe. A suitable probe has a zirconia detection element capable of measuring very low oxygen concentrations as provided by the dissociation of water in the aforementioned atmospheres. In-situ probes function effectively at temperatures of 670K and above.

EXAMPLE 1

Disks with a diameter of i inch (2.54 cm) are cut from a tape with a thickness of 0.008 inches (0.15 cm) and a composition of 81.8% alumina, 3.1% kaolin, 5.0% talc, and 10.1% by weight binder/plasticizer comprising poly(vinylbutyral). The disks are stacked twelve layers high and bonded together at a temperature of 90° C. (363K) and a pressure of 5000 psi ($3.44 \times 10^7$ Pa) for 5 minutes. Bonded laminates are individually heated at the rate of 5K/min to 1000 ° C. (1273K) in a tube furnace 1.75 inches (2.7 cm) in inside diameter through which passes a gas flow of 10 scfh ($79 \times 10^6$ cubic meters/sec). The gas composition used for each individual specimen is held constant in composition.

However, the gas composition for the various specimens comprises nitrogen, hydrogen and water vapor content in various ratios. After the heating steps are completed, each specimen is cooled in a flow of nitrogen.

From the center of each specimen, a sample is taken and analyzed for carbonaceous residue. The results are plotted in FIG. 2 as a contour map with lines of constant carbonaceous residue content in ppm. The ordinate is volume percent of water, and the abscissa is volume percent of hydrogen in nitrogen and hydrogen. Also plotted on the map are lines of constant hydrogen-to-water ratio of 2, 3 and 4 respectively denoted as A, B, and C.

Figure 2:
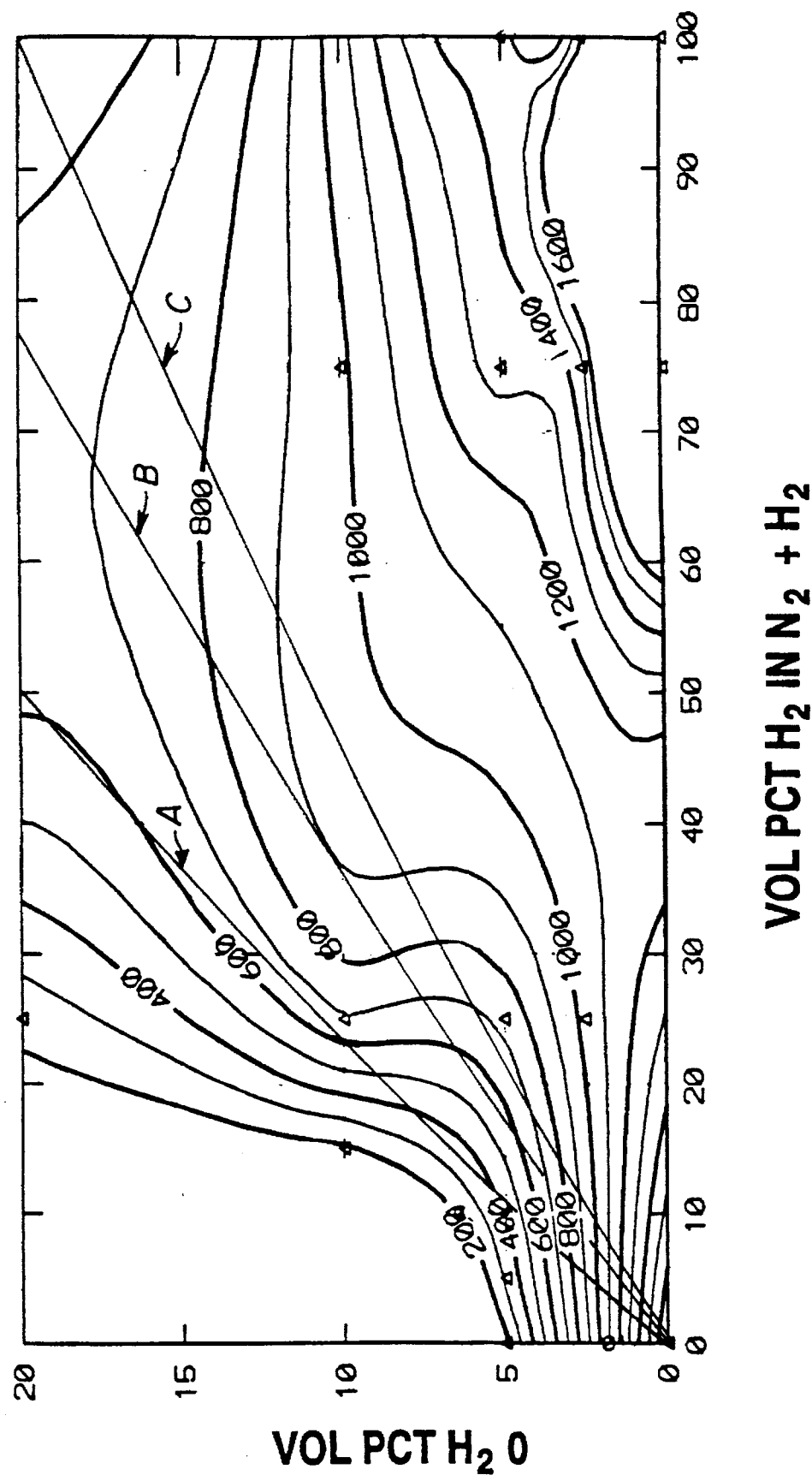
FIG. 2 is a contour map with lines of constant carbonaceous residue content in ppm obtained in heating green laminated structures to 1000° C. (1273K) in various gaseous atmospheres. On the ordinate is the volume percent of water vapor, and on the abscissa is the volume percent of hydrogen in nitrogen and hydrogen. Also shown on the map are lines of constant hydrogen-to-water ratio of 2, 3, and 4 respectively denoted as A, B and C.

FIG. 2 shows that lower carbonaceous residue contents are achieved at hydrogen concentrations of 20% or less, preferably, 15% or less. At about 14% hydrogen and about 7% water, a carbonaceous residue content of 350 ppm is achieved. This carbonaceous residue content is a minimum for the hydrogen-to-water ratio of 2, which at temperatures greater than 700° C. (973K) provides a composition which is not oxidizing with respect to tungsten and is oxidizing with respect to carbon.

At temperatures greater than 800 ° C. (1073K), a hydrogen-to-water ratio of 2.5 provides a composition which is not oxidizing with respect to molybdenum and is oxidizing with respect to carbon. At this ratio according to FIG. 2, the minimum carbonaceous residue content is about 500 ppm and the corresponding atmospheric composition is about 18% hydrogen and about 7% water.

To maintain a reducing or neutral composition with respect to tungsten or molybdenum below temperatures of 700° C. (973K), higher hydrogen-to-water ratios than 2 are required. According to FIG. 2 even at a ratio of 4, to achieve lowest carbonaceous residue content, the atmosphere should have a hydrogen content of about 25% and a water content of about 6.5%. Thus FIG. 2 indicates the desirability of atmospheres not exceeding 20% hydrogen content and 11% water content to achieve lowest carbonaceous residue content. Preferably the hydrogen content should not exceed 15%.

For comparison, to achieve low levels of carbonaceous residue content at high concentrations of hydrogen, e.g., 75% hydrogen, water concentrations of greater than 15% are indicated by FIG. 2. At this level of hydrogen and water and a heating rate of 5 K/min, bloating of the specimen occurs and the product is unacceptable.

EXAMPLE 2

Specimens of laminate manufactured as described above in Example 1 are heated at a rate of 5 K/min in a dry atmosphere of 10% hydrogen in nitrogen to an intermediate temperature at which 5% water is introduced and heating is continued to 1000° C. (1273 K). The specimen is cooled in dry nitrogen and the carbonaceous residue content is determined. Results are given in Table 1 below.

TABLE 1

| Water introduction temperature, °C. (K.) | Carbonaceous residue content, ppm |
| --- | --- |
| 100 (373) | 400 |
| 500 (773) | 220 |
| 600 (873) | 100 |
| 920 (1193) | 560 |

For comparison, by heating from about 373K to 1273K in an atmosphere of 5% water, 10% hydrogen and the balance nitrogen, the carbonaceous residue content is 400 ppm. Thus by heating initially in a dry atmosphere to an intermediate temperature in the range of from about 400° C. (673K) to about 700° C. (973K), and then introducing water and heating to 1000° C. (1273 K), lower carbonaceous residue content is attained than by heating from room temperature to 1000° C. (1273K) in an atmosphere with 5% water. However, in similar heatings to 1000° C. (1273K) in an atmosphere of 25% hydrogen in nitrogen, no reduction in carbonaceous residue content is observed by introducing water at an intermediate temperature over that achieved by heating in dry gas.

Although the invention has been described with reference to specific embodiments as examples, it will be appreciated that it is intended to cover all modifications and equivalents within the scope of the appended claims.

What is claimed is:

1. A process of debinding to a low carbonaceous residue content of less than 500 ppm a green structure comprising tungsten or molybdenum metal circuitry deposited on a plurality of layers of ceramic powder containing alumina, and binder containing poly(vinylbutyral), said process comprising:

(a) providing an initial dry atmosphere comprising inert gas and up to 20% hydrogen by volume and which is reducing or neutral with respect to the metal circuitry;

(b) initially heating the green structure in said initial dry atmosphere to a temperature between about 670° K. and 970° K. when the metal circuitry is predominantly tungsten and between about 670° K. and about 1070° K. when the metal circuitry is predominantly molybdenum, where the atmosphere can be both oxidizing with respect to carbon and neutral or reducing with respect to the metal circuitry;

(c) providing at said temperature a subsequent atmosphere comprising inert gas, water vapor and up to 20% hydrogen, said subsequent atmosphere being oxidizing with respect to carbon and neutral or reducing with respect to the metal circuitry; and (d) subsequently heating the structure in said subsequent atmosphere to a temperature at which the evolution of binder and carbonaceous matter from the structure substantially ceases.

2. The process as in claim 1 wherein the hydrogen in said atmospheres provided in step (a) and step (c) comprise up to 15% hydrogen.

3. The process as in claim 1 wherein the metal is predominantly tungsten and said temperature in step (b) is about 970° K.

4. The process as in claim 1 wherein the metal circuitry is predominantly tungsten, said temperature in step (b) is about 970° K. and the hydrogen-to-water ratio in step (c) is maintained at about 2.

5. The process as in claim 1 wherein the metal circuitry is predominantly molybdenum and said temperature in step (b) is about 1070° K.

6. The process as in claim 1 wherein the metal circuitry is predominantly molybdenum, said temperature in step (b) is about 1070° K. and the hydrogen-to-water ratio in step (c) is maintained at about 2.5.

7. The process as in claim 1 wherein said heating is at a rate in the range from about 4° K./min to about 10° K./min.

8. The process as in claim 1 wherein said water vapor is provided by supplying hydrogen gas and oxygen gas.

9. The process as in claim 1 wherein said atmosphere is controlled by measuring the oxygen concentration proximate to the structure by an in-situ probe, and controlling the supply of oxygen-containing gas to yield an oxygen concentration providing the specified oxidizing conditions.

10. The process as in claim 2 wherein the process is conducted in a continuous furnace having a length over which temperature increases, and said water vapor is provided by injecting a controlled amount of oxygen-containing gas at a point in the furnace where the temperature is in the range of from about 670° K. to about 940° K.

11. The process as in claim 10 wherein an in-situ probe is used at a temperature of at least 670° K. to control the supply of oxygen-containing gas to yield an oxygen concentration providing the specified oxidizing conditions.

12. The process as in claim 1 wherein the process is conducted in a batch furnace and said water vapor is provided by injecting a controlled amount of oxygen-containing gas when the temperature of the furnace reaches from about 670° K. to about 970° K., the injection continuing until the furnace temperature reaches at least about 1270° K.

13. The process as in claim 12 wherein an in-situ probe is used at a temperature of at least 670°0 K. to control the supply of oxygen-containing gas to yield an oxygen concentration providing the specified oxidizing conditions.

14. The process of claim 1 wherein the heating in step d) is carried out at a higher temperature than the heating in step b).

15. The process as in claim 1 wherein the said green structure is heated in said initial dry atmosphere to a temperature from about 770° K. to about 970° K.

16. The process as in claim 1 wherein the hydrogen-to-water ratio in said subsequent atmosphere in step (c) is greater than about 1.

17. The process as in claim 2 wherein the hydrogen-to-water ratio in step (c) is maintained at about 2 to about 4.

18. The process as in claim 9 wherein the hydrogen-to-water ratio in said subsequent atmosphere in step (c) is maintained at greater than about 1 by the injection of the oxygen-containing gas.

* * * * *

UNITED STATES PATENT AND TRADEMARK OFFICE
CERTIFICATE OF CORRECTION

PATENT NO. : 5,578,257
DATED : November 26, 1996
INVENTOR(S) : Jaak Stefaan Van Den Sype It is certified that error appears in the above-identified patent and that said Letters Patent is hereby corrected as shown below:

Column 6:
Claim 7, line 2, replace "about 4°K.(/min" with
-- about 4°K./min"

Column 7:

Claim 10, change the dependency from "claim 2" to "claim 1".

Signed and Sealed this

Twenty-first Day of January, 1997

Attest:

BRUCE LEHMAN

Attesting Officer     Commissioner of Patents and Trademarks